(12) United States Patent
Kawashima (10) Patent No.: US 11,499,613 B2
(45) Date of Patent: Nov. 15, 2022

(54) TORQUE CONVERTER (71) Applicants: JATCO Ltd, Fuji (JP); NISSAN MOTOR CO., LTD., Yokohama (JP)

(72) Inventor: Kazunori Kawashima, Atsugi (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 17/278,800

(22) PCT Filed: Jul. 11, 2019

(86) PCT No.: PCT/JP2019/027522
§ 371 (c)(1),
(2) Date: Mar. 23, 2021

(87) PCT Pub. No.: WO2020/079898
PCT Pub. Date: Apr. 23, 2020

(65) Prior Publication Data
US 2022/0025962 A1 Jan. 27, 2022

(30) Foreign Application Priority Data
Oct. 17, 2018 (JP) .............................. JP2018-195821

(51) Int. Cl.
*F16H 41/26* (2006.01)
*F16H 45/02* (2006.01)
*F16D 33/20* (2006.01)

(52) U.S. Cl.
CPC ............. *F16H 41/26* (2013.01); *F16D 33/20* (2013.01); *F16H 45/02* (2013.01)

(58) Field of Classification Search
CPC ........... F16H 41/26; F16H 45/02; F16D 33/20
See application file for complete search history.

(56) References Cited

U.S. PATENT DOCUMENTS

| | | | | |
|---|---|---|---|---|
| 4,783,960 A * | 11/1988 | Kubo | ...................... | F16H 41/04 415/62 |
| 4,866,935 A * | 9/1989 | Hayabuchi | .............. | F16H 45/02 60/367 |
| 5,152,139 A * | 10/1992 | Becraft | .................... | F16H 41/26 60/330 |
| 5,313,793 A * | 5/1994 | Kirkwood | ............... | F16H 41/26 60/361 |
| 6,447,245 B1 * | 9/2002 | Oakley | ................... | F04D 7/045 415/206 |

(Continued)

FOREIGN PATENT DOCUMENTS

| DE | 102008042665 A1 | 4/2010 |
|---|---|---|
| JP | S58-024650 A | 2/1983 |

(Continued)

*Primary Examiner* — Dustin T Nguyen
(74) *Attorney, Agent, or Firm* — Foley & Lardner LLP (57) ABSTRACT

A torque converter has a torus. The torus has a size set based on a flatness ratio obtained by dividing a width of the torus in an axial direction by a width of the torus in a radial direction, a thinness ratio obtained by dividing the width of the torus in the axial direction by an outer diameter of the torus, and an inner diameter ratio obtained by dividing an inner diameter of the torus by the outer diameter of the torus.

2 Claims, 5 Drawing Sheets

(56) References Cited

U.S. PATENT DOCUMENTS

| 6,575,276 | B2* | 6/2003 | Fukunaga | F16H 45/02 |
| | | | | 192/3.29 |
| 2002/0056600 | A1 | 5/2002 | Fukunaga | |
| 2004/0118112 | A1* | 6/2004 | Mori | F16H 41/26 |
| | | | | 60/330 |
| 2010/0083648 | A1 | 4/2010 | Sasse | |
| 2010/0178172 | A1* | 7/2010 | Yamashita | F16H 41/26 |
| | | | | 416/197 C |

FOREIGN PATENT DOCUMENTS

| JP | 2002-147563 A | 5/2002 |
| JP | 2018-009632 A | 1/2018 |

\* cited by examiner

FIG.10 under>
TORQUE CONVERTER

TECHNICAL FIELD

The present invention relates to a torque converter.

BACKGROUND ART

JP2018-9632A discloses a torque converter for holding down dimensions in an axial direction.

SUMMARY OF INVENTION

In recent years, approaches have been made in vehicles to implement downsized turbocharged engines. The downsized turbocharged engines are advantageous in fuel economy, however gives the following effects on the torque converter. Namely, the downsized turbocharged engines cause an increase in fluctuation of input torque from the engine due to the reduction in the number of cylinders. Moreover, the input torque from the engine decreases upon starting, since the engine operating state upon starting is in a non-turbocharged region or in a transient state to a turbocharged region.

In order to hold down the fluctuation in the input torque, a damper element of high attenuation is necessary. Moreover, in order to compensate for the decrease in the input torque, a large torus is necessary to improve its torque ratio performance. As a result, in this case, in addition to the point that a damper element of high attenuation is necessary, by using a large torus, the increase in size caused by the dimension of the torque converter extending in an axial direction becomes difficult to avoid. Therefore, in terms of efficient arrangement of the damper element and securing torque ratio performance, it is desirable to optimize the torus.

The present invention is accomplished in view of such problems, and an object thereof is to achieve both an efficient arrangement of the damper element and the securing of the torque ratio performance, by suitably setting the torus.

A torque converter according to a certain aspect of the present invention is a torque converter having a torus. The torus has a size set based on a flatness ratio obtained by dividing a width of the torus in an axial direction by a width of the torus in a radial direction, a thinness ratio obtained by dividing the width of the torus in the axial direction by an outer diameter of the torus, and an inner diameter ratio obtained by dividing an inner diameter of the torus by the outer diameter of the torus.

Here, flatness ratio, thinness ratio, and inner diameter ratio are size indicators of the torus, and give effect on the torque converter while including a trade-off relationship in performance factors. Accordingly, by setting the flatness ratio, thinness ratio and inner diameter ratio suitably, it is possible to obtain a torus desirable in both factors, size and performance.

Therefore, according to the aspect described above, the torus can be suitably set in terms of efficient arrangement of the damper element and securing of the torque ratio performance; hence, both the efficient arrangement of the damper element and the securing of the torque ratio performance may be achieved.

DESCRIPTION OF EMBODIMENTS

An embodiment of the present invention will be described below with reference to the accompanying drawings.

Figure 1:
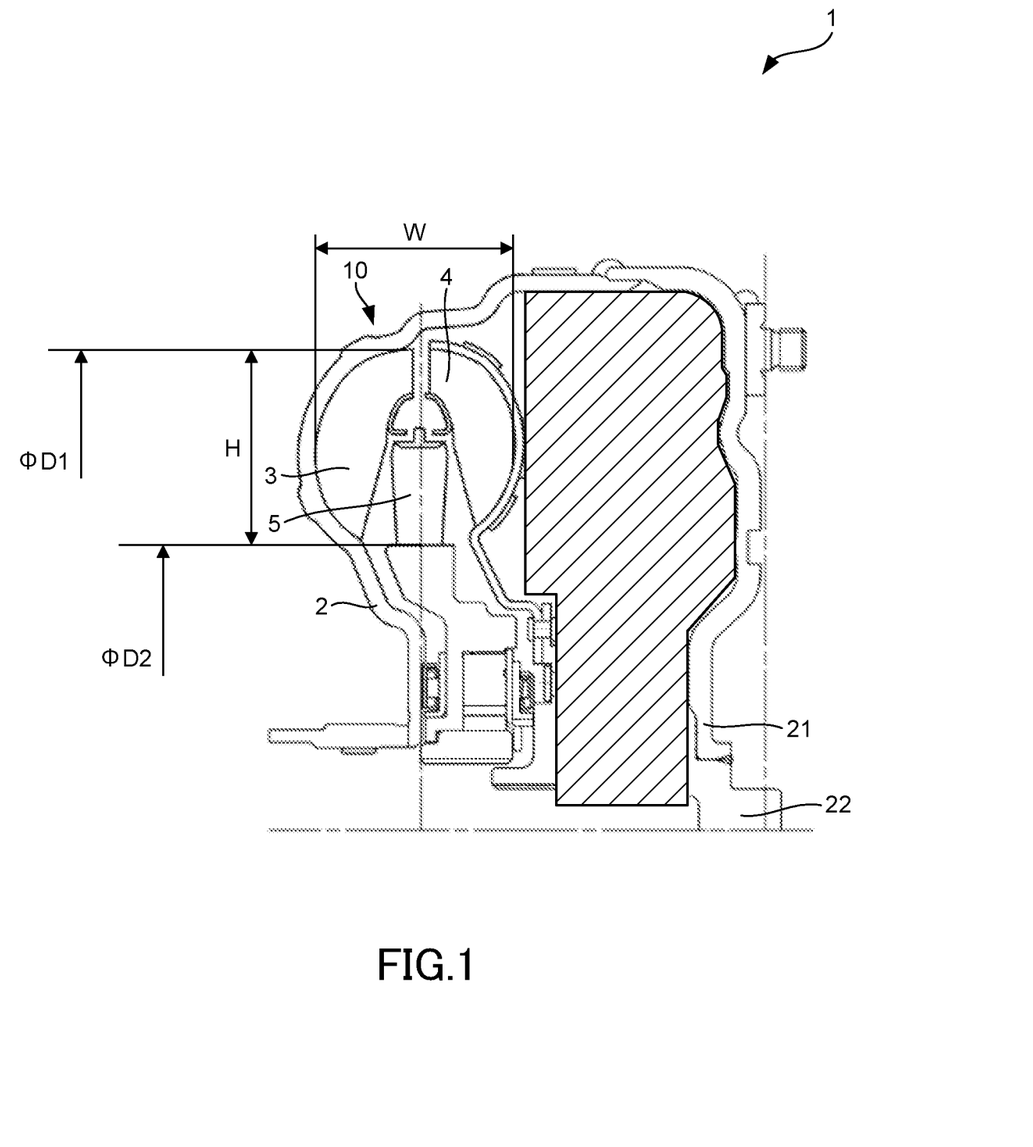
FIG. 1 is a schematic diagram of a torque converter.

FIG. 1 is a schematic diagram of a torque converter 1. FIG. 1 illustrates essential parts of the torque converter 1 in a cross section. The torque converter 1 includes a cover 2, a pump impeller 3, a turbine runner 4, and a stator 5.

The cover 2 is connected to an engine not illustrated. The cover 2 is configured having a front cover 21, and constitutes a casing of the torque converter 1. A cylindrical shaft 22 is fixed on an inner side in a radial direction of the front cover 21.

The cover 2 houses the pump impeller 3, the turbine runner 4, and the stator 5. The pump impeller 3 is provided on the cover 2. The turbine runner 4 is arranged facing the pump impeller 3, and is connected to an output shaft. The stator 5 is arranged between the pump impeller 3 and the turbine runner 4.

The torque converter 1 has a torus 10. The torus 10 is a flow path space for hydraulic oil formed by the pump impeller 3 and the turbine runner 4, and has an outer diameter D1, an inner diameter D2, a radial direction width H and an axial direction width W.

In the illustrated hatched part are arranged a lock-up clutch and a damper element. The damper element includes a damper mechanism configured to have a plurality of damper springs arranged evenly on its circumference, and a high attenuation damper that absorbs vibration occurring on the damper mechanism. As the high attenuation damper, a damper element of a type absorbing vibration by a pendulum movement may be used, for example.

In recent years, approaches have been made in vehicles to implement downsized turbocharged engines. The downsized turbocharged engines are advantageous in fuel economy, however gives the following effects on the torque converter 1. Namely, the downsized turbocharged engines cause an increase in fluctuation of input torque from the engine due to the reduction in the number of cylinders. Moreover, the input torque from the engine decreases upon starting, since the engine operating state upon starting is in a non-turbocharged region or in a transient state to a turbocharged region.

In order to hold down the fluctuation in the input torque, a damper element of high attenuation is necessary. Moreover, in order to compensate for the decrease in the input torque, a large torus is necessary to improve its torque ratio performance. As a result, in this case, in addition to the point that a damper element of high attenuation is necessary, by using a large torus, the increase in size caused by the dimension of the torque converter 1 extending in an axial direction becomes difficult to avoid.

From such circumstances, in the present embodiment, the torus 10 is set as described below to optimize the torus 10 in terms of efficiently arranging the damper element and securing the torque ratio performance.

(Request to Secure Torque Ratio Performance)

Figure 2:
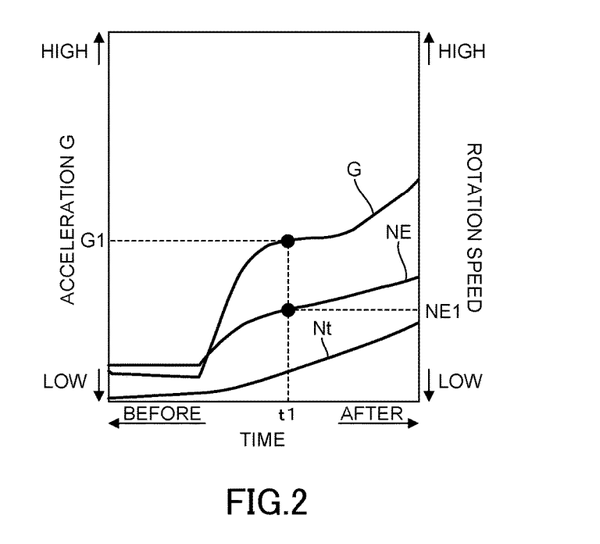
FIG. 2 is a view illustrating changes in engine rotation speed, vehicle acceleration and turbine rotation speed upon starting.
Figure 3:
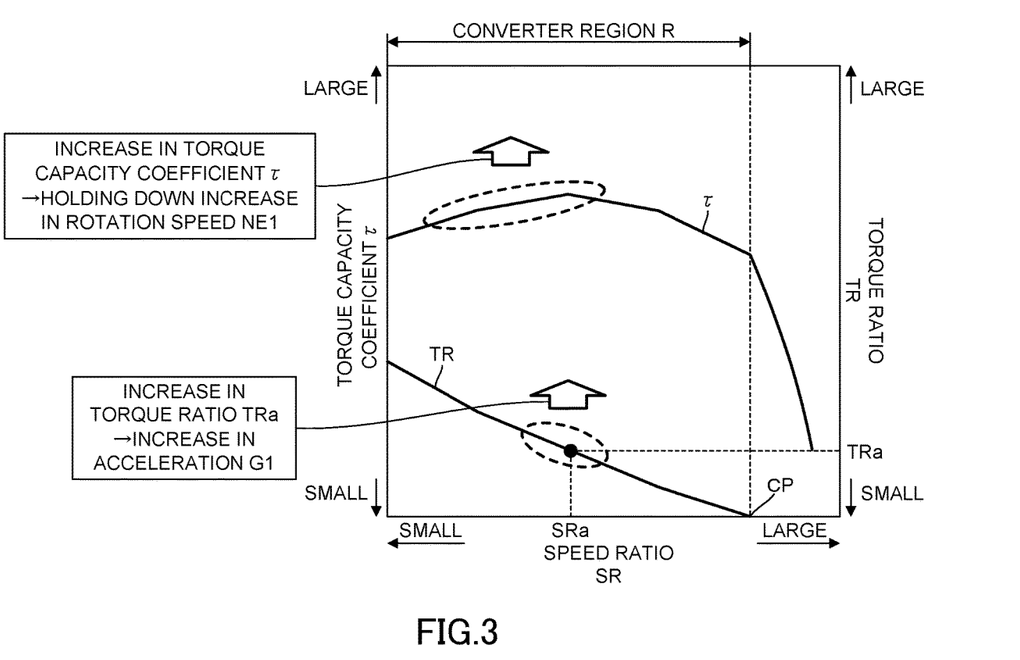
FIG. 3 is a view illustrating a relationship between speed ratio and torque ratio of the torque converter with torque capacity coefficient.

FIG. 2 is a view illustrating changes in engine rotation speed NE, acceleration G of the vehicle, and rotation speed Nt of the turbine runner 4, upon starting. FIG. 3 is a view illustrating a relationship between a speed ratio SR and a torque ratio TR of the torque converter 1 with a torque capacity coefficient τ. The speed ratio SR is a value obtained by dividing a rotation speed of an output shaft of the torque converter 1 by a rotation speed of an input shaft thereof. The torque ratio TR is a value obtained by dividing the output shaft torque of the torque converter 1 by the input shaft torque thereof. The torque capacity coefficient τ is a value obtained by dividing the input shaft torque of the torque converter 1 by a square of the input shaft rotation speed.

Further describing the above circumstance, in implementing the downsized turbocharged engine, the engine is driven in the non-turbocharged region or in the transient region to the turbocharged region upon starting; hence, torque deficiency will occur. That is to say, in the case of using the downsized turbocharged engine, if the torque ratio TR is unchanged, the acceleration G results insufficient upon starting.

On the other hand, even if the downsized turbocharged engine is implemented, as for vehicle performance it is desired to secure the acceleration G upon starting. In order to do so, it is desired to secure the torque ratio performance of the torque converter 1.

The torque ratio performance may be secured, for example, by increasing the acceleration G1 to a magnitude of a desired degree at a time after generally time t1 has elapsed from starting the vehicle. To secure the torque ratio performance as such, the torque ratio TR may be managed by a speed ratio SRa, which is an intermediate speed ratio of a converter region R. The converter region R is a speed ratio region having a torque amplifying function, and is a region having a smaller speed region SR than a coupling point CP in which the torque ratio TR is 1. The speed ratio SRa is 0.4 for example, and this serves as a median value for the entire converter region R, representing the entire converter region R.

Based on the above, in the case of implementing the downsized turbocharged engine, the torque ratio performance can be secured by increasing the torque ratio TRa in the speed ratio SRa.

With the torque converter 1, while it is desired to secure the acceleration G by securing the torque ratio performance, it is also desired to secure the torque capacity coefficient τ that is required to hold down an increase in the rotation speed NE. In securing the torque capacity coefficient τ, for example, it is possible to secure the torque capacity coefficient τ to a magnitude that is capable of holding down the engine rotation speed NE1 after generally the time t1 has elapsed from the starting of the vehicle to a desired magnitude.

(Request for Efficient Arrangement of Damper Element)

In general, to improve the torque ratio TR, the axial direction width W of the torus 10 may not be set significantly narrow. Furthermore, implementation of the downsized turbocharged engine causes poor fluctuation of the input torque from the engine, and a high attenuation damper element becomes necessary. As a result, the entire torque converter 1 extends in length in the axial direction dimension. Therefore, it is desirable to minimize the torus 10 as much as possible to efficiently arrange the damper element. For example in a case in which a shape of the torus 10 is the same, it is possible to ensure a space for arranging the damper element in the hatched region illustrated in FIG. 1, that is to say, in the region between the torus 10 and the front cover 21 in the axial direction by reducing the size of the torus 10.

(Definition of Torus Size)

Dimensions to determine the size of the torus 10 are the outer diameter D1, the inner diameter D2, the radial direction width H and the axial direction width W, as described above using FIG. 1. With respect to these actual dimensions, the present embodiment uses flatness ratio, inner diameter ratio, and thinness ratio as size indicators of the torus 10.

The flatness ratio is a value obtained by dividing the axial direction width W of the torus 10 by the radial direction width H thereof, namely "W/H". The inner diameter ratio is a value obtained by dividing the inner diameter D2 of the torus 10 by the outer diameter D1 thereof, namely "D2/D1". The thinness ratio is a value obtained by dividing the axial direction width W by the outer diameter D1 thereof, namely "W/D1".

The flatness ratio, inner diameter ratio and thinness ratio are dimensionless qualities, and further the inner diameter ratio and the thinness ratio are nondimensionalized based on the outer diameter D1. This is due to points that the torque capacity coefficient τ is proportional to the fifth power of the outer diameter D1 of the torus 10 as long as it is of a similar shape (hereinafter, called fifth power rule), and that the torque ratio TR depends on the shape but not on the size. The torque ratio TR actually varies in size caused by Reynolds number or the like, however this will be ignored in discussing the performance potential described below.

(Definition of Performance)

Figure 4:
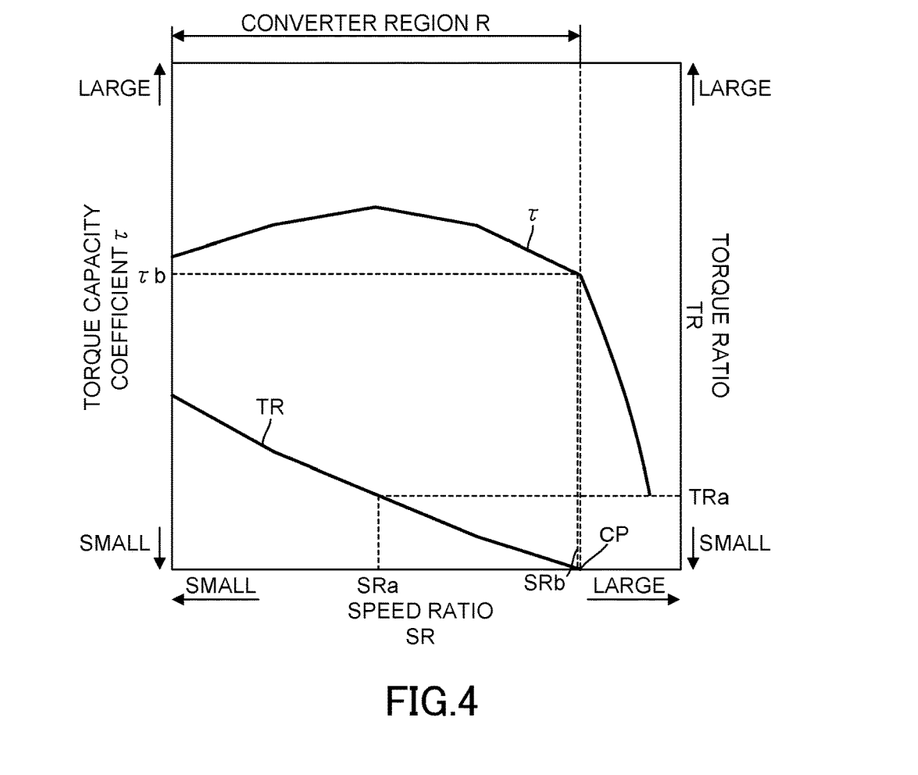
FIG. 4 is a view describing a representative indicator for fluid performance of the torque converter.

FIG. 4 is a view describing a representative indicator of fluid performance of the torque converter 1. In the present embodiment, the following two indicators are used as representative indicators for the fluid performance of the torque converter 1. Namely, a torque ratio TRa at the time of the speed ratio SRa is used as an evaluation of the torque amplifying function. Moreover, a nondimensional torque capacity K_τb is used as a potential evaluation of the torque capacity. The nondimensional torque capacity K_τb is a value obtained by dividing the torque capacity coefficient τb in the speed ratio SRb prior to (immediately before) the coupling point CP by the fifth power of the outer diameter D1.

The reason the torque ratio TRa is used is to secure the torque ratio performance, as described above. The reason the nondimensional torque capacity K_τb is used is to secure a torque capacity coefficient τ of a magnitude capable of holding down the engine rotation speed NE1 to a desired magnitude. Moreover, the reason the nondimensional torque capacity K_τb serves as an indicator in accordance with the speed ratio SRb is because if it is the speed ratio SRb prior to the coupling point CP, this will not depend much on tuning using flow separation due to a blade shape of the stator 5, and is suitable for evaluating a potential of the torus 10.

The torque ratio TRa and the nondimensional torque capacity K_τb have a trade-off relationship in accordance with an outlet angle of the pump impeller 3. For example, a forward blade having the outlet angle of the pump impeller 3 directed to the same direction as the rotating direction achieves a low torque ratio and a high torque capacity, whereas a backward blade directing this in the opposite direction achieves a high torque ratio and a low torque capacity.

Therefore, in order to define the torque ratio TRa and nondimensional capacity K_τb reflecting such sensitivity characteristics, these indicators are further collected to a performance indicator Kab described next.

Figure 5:
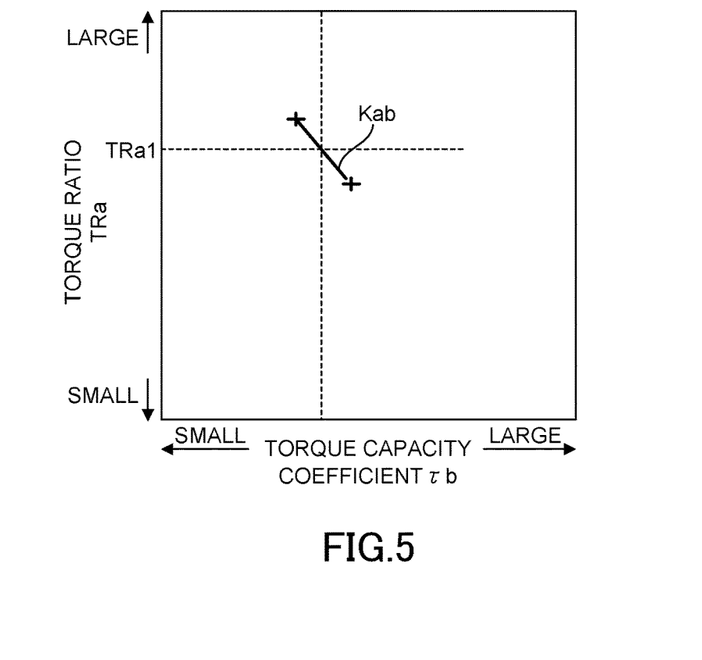
FIG. 5 is a view illustrating a performance indicator in accordance with a sensitivity characteristic with respect to an outlet angle of a pump impeller.

FIG. 5 is a view illustrating the performance indicator Kab in accordance with sensitivity characteristics with respect to the outlet angle of the pump impeller 3. The performance indicator Kab is a value obtained by dividing the torque capacity coefficient τb_TRa by the fifth power of the outer diameter D1, namely "τb_TRa/D1$^5$". The torque capacity coefficient τb_TRa is the torque capacity coefficient τb while the torque ratio TRa is secured. The torque ratio TRa1 illustrated is a torque ratio TRa determined by a goal or the like allotted from a power performance goal. As illustrated in FIG. 5, the performance indicator Kab in accordance with the sensitivity characteristics with respect to the outlet angle of the pump impeller 3 has a trade-off relationship in which when the torque capacity coefficient τb increases, the torque ratio TRa decreases.

(Mapping of Relationship Between Torus Size and Performance)

Figure 6:
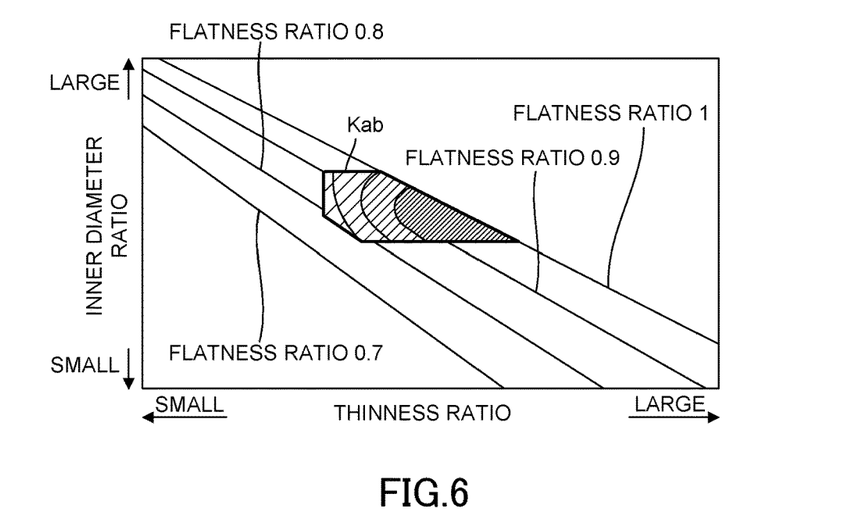
FIG. 6 is a map data illustrating a performance indicator in accordance with size indicators of a torus.

FIG. 6 is a map data illustrating the performance indicator Kab in accordance with the size indicators of the torus 10, namely the flatness ratio, inner diameter ratio and thinness ratio. The map data illustrated in FIG. 6 illustrates a CFD analyzed performance indicator Kab, and illustrates that the darker the hatched region, the higher the performance potential. The performance potential region is formed as such based on the following qualitative mechanism.

That is to say, regarding the flatness ratio, when the flatness ratio is made closer to 1 thus making the torus 10 into a round shape, flow loss in the circulating flow is reduced, and both the torque ratio TR and the torque capacity coefficient τ increase. Regarding the inner diameter ratio, increasing the inner diameter ratio causes an increase in an outlet diameter of the turbine runner 4; this causes the torque ratio TR when the speed ratio SR is of a low speed ratio to increase, and the torque ratio TR when the speed ratio SR is of a high speed ratio (for example, coupling speed ratio) to decrease. Moreover, since an inlet diameter of the pump impeller 3 increases and a pump lift becomes small, the torque capacity coefficient τ decreases. Regarding the thinness ratio, when the flatness ratio is increased within a range approximately not exceeding 1, the performance potential improves. As such, the flatness ratio, inner diameter ratio and thinness ratio each serving as the size indicator of the torus 10 give effect on the torque converter 1 while including a trade-off relationship in the performance factors.

The optimum values of the actual dimensions of the outer diameter D1, inner diameter D2, axial direction width W, and radial direction width H cannot be indicated just by the map data illustrated in FIG. 6. The conversion to the required actual dimensions may be performed on the basis of the fifth power rule and a relationship with the required torque capacity coefficient τbreq. Namely, a required outer diameter D1req may be calculated by the following Math. 1 based on the fifth power rule. Furthermore, a required inner diameter D2req, a required axial direction width Wreq, and a required radial direction width Hreq may be calculated by the following Maths. 2 to 4.

$$D1req = (\tau breq/Kab)^{1/5} \quad \text{[Math. 1]}$$

$$D2req = D1req \times \text{inner diameter ratio} \quad \text{[Math. 2]}$$

$$Wreq = D1req \times \text{thinness ratio} \quad \text{[Math. 3]}$$

$$Hreq = W1req/\text{flatness ratio} \quad \text{[Math. 4]}$$

According to Maths. 1 to 4, the actual dimensions required for the torus 10 may be calculated from the map data illustrated in FIG. 6.

According to the map data illustrated in FIG. 6, a relationship between the size indicators that give effect on the torque converter 1 while including a trade-off relationship in the performance factor and the performance indicator Kab are visualized. Based on this point, in the condition of securing the required performance, namely in the desired torque capacity coefficient τbreq and the torque ratio TRa1, the conditions to minimize the size of the torus 10 may be calculated as follows.

Figure 7:
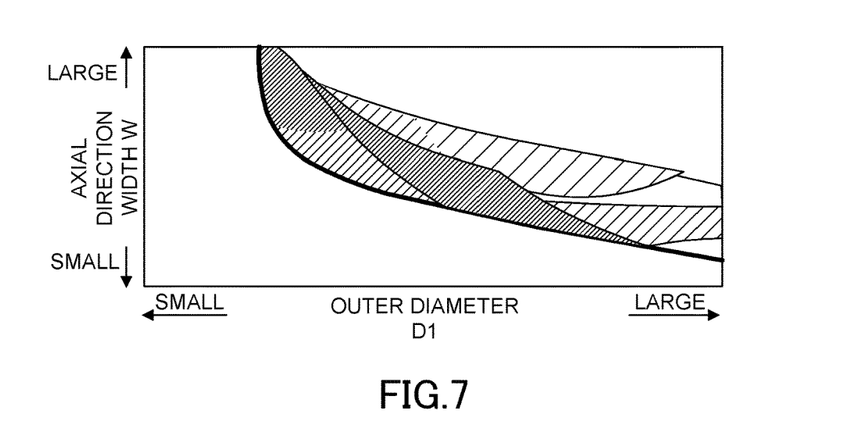
FIG. 7 is a view illustrating a relationship between a required outer diameter and a required axial direction width with a flatness ratio.
Figure 8:
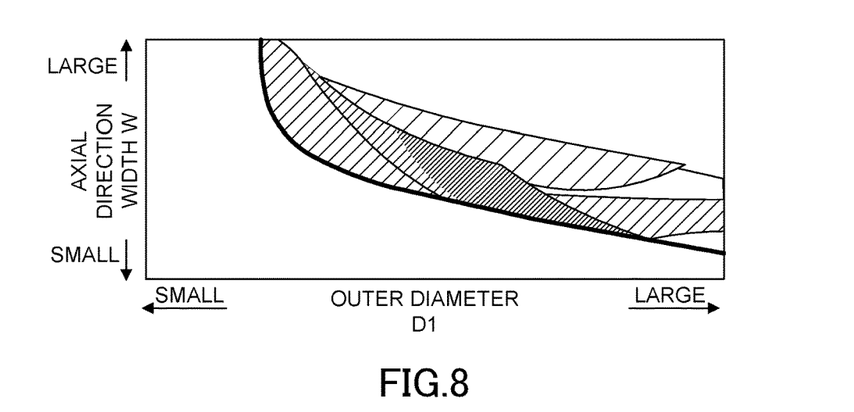
FIG. 8 is a view illustrating a relationship between a required outer diameter and a required axial direction width with an inner diameter ratio.

FIG. 7 is a view illustrating a relationship between the required outer diameter D1req and required axial direction width Wreq, with the flatness ratio. FIG. 8 is a view illustrating a relationship between the required outer diameter D1req and required axial direction width Wreq, with the inner diameter ratio. FIG. 7 indicates a greater flatness ratio with a darker hatched region. FIG. 8 indicates a greater inner diameter ratio with a darker hatched region.

FIGS. 7 and 8 show how the size of the torus 10 will become under the condition of securing the required performances. This is because a value obtained by multiplying the outer diameter D1 with the axial direction width W, namely "D1×W", indicates the size of the external shape of the torus 10.

On the thick line curves in FIGS. 7 and 8, the axial direction width W in accordance with the outer diameter D1, or the outer diameter D1 in accordance with the axial direction width W becomes the minimum. Therefore, setting the outer diameter D1 and the axial direction width W on the thick line curve of FIGS. 7 and 8 serves as the condition to minimize the size of the torus 10.

In FIGS. 7 and 8, a locus of the size indicators along the thick line curve (namely, the flatness ratio, inner diameter ratio and thinness ratio that minimize the size of the torus 10) becomes common, without depending on the magnitude of the required torque capacity coefficient τb (namely, according to the fifth rule, the size of the outer diameter D1). Accordingly, "D1×W" is defined as a cross section indicator S that is an indicator representing the size of the external shape of the torus 10, and sets the size of the torus 10 as follows.

(Setting Range of Torus Size)

Figure 9:
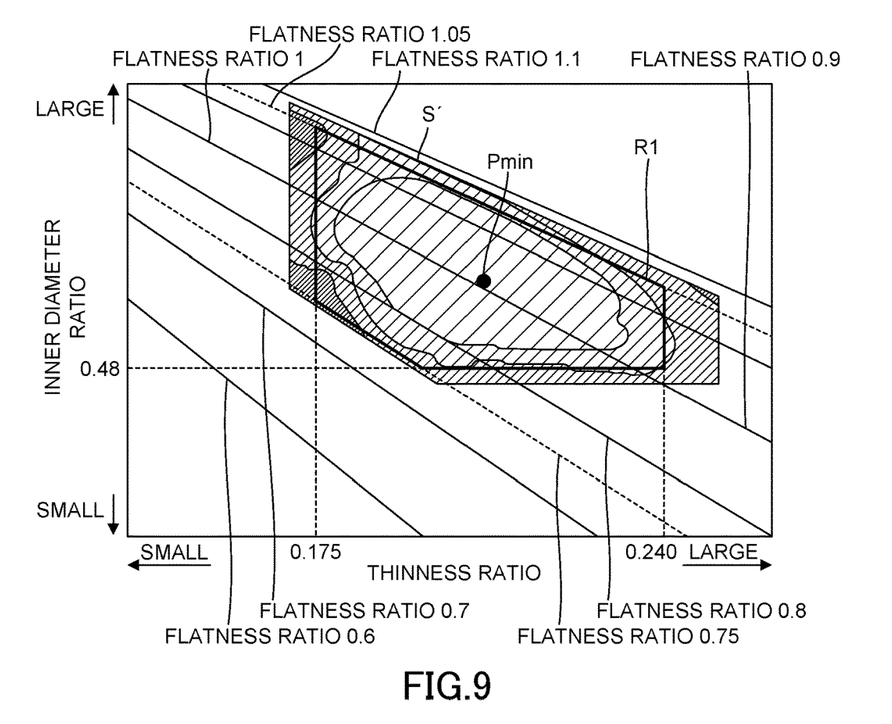
FIG. 9 is a view describing a first size setting range of the torus.

FIG. 9 is a view describing a first size setting range of the torus 10. In FIG. 9, a proportional cross section indicator S' with respect to the size indicators is illustrated as with the map data illustrated in FIG. 6. The proportional cross section indicator S' is a value obtained by dividing the cross section indicator S by a minimal value of the cross section indicator S, Smin, namely, "S/Smin". FIG. 9 indicates a greater proportional cross section indicator S' with a darker hatched region.

The following organizes the effect on the performance of size indicators.

Regarding the flatness ratio, when made closer to a round shape (made closer to 1), the flow loss is reduced in the circulating flow, and both the torque ratio TR and the torque capacity coefficient τ increases.

Regarding the thinness ratio, when the flatness ratio is increased within a range approximately not exceeding 1, the performance potential improves. Therefore, by increasing the thinness ratio within this range, it is possible to reduce the outer diameter D1 while improving the performance potential.

Regarding the inner diameter ratio, when the outlet size of the turbine runner 4 increases, the torque ratio TR when the speed ratio SR is of a low speed ratio increases, and the torque ratio TR when the speed ratio SR is of a high speed ratio (for example, coupling speed ratio) decreases. Moreover, when the outlet size of the turbine runner 4 increases, the inlet size of the pump impeller 3 also increases, which makes the pump lift small. Accordingly, the torque capacity coefficient τ decreases.

Namely, while the size indicators give effect on the performance of the torque converter 1 having a qualitative mechanism as such, in FIG. 9, the proportional cross section indicator S' indicates how the size of the torus 10 becomes under a condition of securing the required performance without depending on the magnitude of the required torque capacity coefficient τb. Therefore, by selecting the size indicators that make the proportional cross section indicator S' minimum, achieving both of the efficient arrangement of the damper element and the securing of the torque ratio performance are optimized.

In FIG. 9, a minimum point P min indicates a size indicator in which the proportional cross section indicator S' becomes the smallest. Therefore, the cross section indicator S will be the minimum value at the minimum point P min. Looking at the relationship between the cross section indicator S and the size indicators, regarding the flatness ratio, the cross section indicator S can be made the smallest at around 0.9. Regarding the thinness ratio, the cross section indicator S may be made the smallest at around 0.21. Regarding the inner diameter ratio, the cross section indicator S may be made the smallest at around 0.55.

As from the above, in the present embodiment, the torque converter 1 is of a configuration whose torus 10 is of a size set based on the flatness ratio, thinness ratio, and inner diameter ratio.

According to such configuration, the torus 10 can be suitably set in terms of the efficient arrangement of the damper element and the securing of the torque ratio performance; hence, both the efficient arrangement of the damper element and the securing of the torque ratio performance may be achieved.

In FIG. 9, a region R1 enclosed by the thick line is a range in which the cross section indicator S is approximately +10% from the minimum point P min, and indicates a range in which the flatness ratio is 0.75 to 1.05, the thinness ratio is 0.175 to 0.240, and the inner diameter ratio is 0.48 or more. In the present embodiment, the torque converter 1 is of a configuration in which the size indicators are set in such range.

According to such configuration, it is possible to hold down the size of the torus 10 to a range within +10% from the minimum size optimum in terms of the efficient arrangement of the damper element, under the condition that secures the required performance. Therefore, according to such configuration, it is possible to suitably set the flatness ratio, the thinness ratio and the inner diameter ratio in terms of the efficient arrangement of the damper element and the securing of the torque ratio performance. Therefore, by suitably setting the torus 10, it is possible to achieve both the efficient arrangement of the damper element and the securing of the torque ratio performance. Moreover, according to such configuration, it is possible to increase the inner diameter ratio of the torus 10 that fits in a shape of a certain range to reduce the size of the torus 10; hence, it is possible to secure the space to arrange the damper element in the region of the hatched part illustrated in FIG. 1, and thus it is possible to arrange the damper element efficiently.

The torque converter 1 may be of a configuration in which the size indicators are set within the following ranges.

Figure 10:
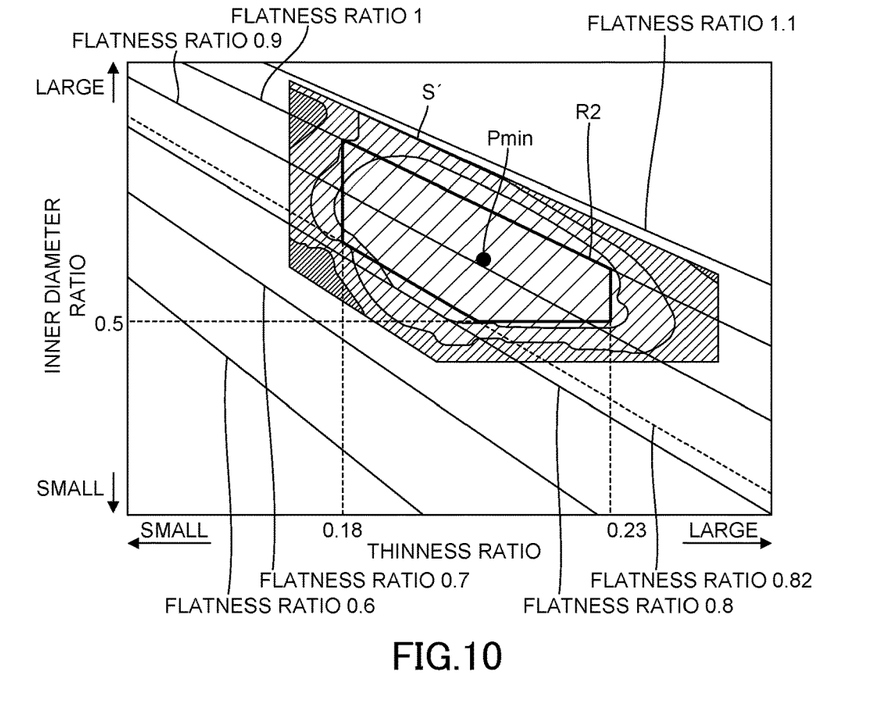
FIG. 10 is a view describing a second size setting range of the torus.

FIG. 10 is a view describing a second size setting range of the torus 10. In FIG. 10, a region R2 enclosed by the thick line is a range in which the cross section indicator S is approximately +5% from the minimum point P min, and indicates a range in which the flatness ratio is 0.82 to 1.00, the thinness ratio is 0.18 to 0.23, and the inner diameter ratio is 0.5 or more.

According to the torque converter 1 setting the size indicators in such ranges, it is possible to hold down the size of the torus 10 to a range within +5% from the minimum size, under the condition of securing the required performance. Therefore, in this case, the torus 10 can be suitably set in terms of the efficient arrangement of the damper element and the securing of the torque ratio performance, and thus both of these can be achieved more suitably. In this case, the darkest hatched region is excluded, and it is possible to hold down the size of the torus 10 more suitably than the case illustrated in FIG. 9. In this case also, the damper element can be efficiently arranged by securing the space for arranging the damper element in the region of the hatched part illustrated in FIG. 1.

The size indicators of the torus 10 may be set so that the cross section indicator S becomes the minimum point P min. Setting the size indicators as such includes setting the cross section indicator S within a variation from the minimum point P min caused by design tolerance and manufacturing error. In this case, it is possible to optimize achieving both of the efficient arrangement of the damper element and the securing of the torque ratio performance.

The above describes an embodiment of the present invention, however the above embodiment merely illustrates one portion of an application example of the present invention, and does not intend to limit the technical range of the present invention to the specific configurations in the above embodiment.

The present application claims a priority based on Japanese Patent Application No. 2018-195821 filed with the Japan Patent Office on Oct. 17, 2018, all the contents of which are hereby incorporated by reference.

The invention claimed is:

1. A torque converter having a torus, wherein
the torus has a size set based on:
a flatness ratio obtained by dividing a width of the torus in an axial direction by a width of the torus in a radial direction,
a thinness ratio obtained by dividing the width of the torus in the axial direction by an outer diameter of the torus, and
an inner diameter ratio obtained by dividing an inner diameter of the torus by the outer diameter of the torus,
the flatness ratio being set within a range of 0.75 to 1.05, the thinness ratio being set within a range of 0.175 to 0.240, and the inner diameter ratio being set within a range of 0.48 or more.

2. A torque converter having a torus, wherein the torus has a size set based on:
- a flatness ratio obtained by dividing a width of the torus in an axial direction by a width of the torus in a radial direction,
- a thinness ratio obtained by dividing the width of the torus in the axial direction by an outer diameter of the torus, and
- an inner diameter ratio obtained by dividing an inner diameter of the torus by the outer diameter of the torus, the flatness ratio being set within a range of 0.82 to 1.00, the thinness ratio being set within a range of 0.18 to 0.23, and the inner diameter ratio being set within a range of 0.5 or more.

* * * * *